United States Patent [19]

Tomita et al.

[11] Patent Number: 4,836,917
[45] Date of Patent: Jun. 6, 1989

[54] APPARATUS FOR PERFORMING SEPARATION OF A SOLID-LIQUID MIXTURE

[75] Inventors: Yoji Tomita; Eiichi Oishi; Hiroshi Miyaji, all of Souwa; Hiroya Morimoto, Kumagaya; Tetsuo Sekigawa, Koga; Kenichi Mitsuhashi, Souwa, all of Japan

[73] Assignee: Kanebo, Ltd., Tokyo, Japan

[21] Appl. No.: 915,570

[22] Filed: Oct. 6, 1986

[51] Int. Cl.$^4$ .................. B01D 33/06; B01D 33/36; B01D 33/38

[52] U.S. Cl. .................. 210/104; 210/194; 210/248; 210/396; 210/402; 210/510.1; 210/143

[58] Field of Search ............ 210/104, 134, 107, 128, 210/129, 349, 393, 396, 248, 143, 397, 402, 510.1, 404, 194, 197

[56] References Cited

U.S. PATENT DOCUMENTS

| | | | |
|---|---|---|---|
| 793,720 | 7/1905 | Godbe | 210/396 |
| 2,306,074 | 12/1942 | Meyer | 210/396 |
| 3,029,948 | 4/1962 | McKay | 210/402 |
| 3,688,337 | 9/1972 | Noda | 210/402 |
| 3,747,770 | 7/1973 | Zentis | 210/402 |
| 3,814,260 | 6/1974 | Daubman et al. | 210/396 |
| 4,126,499 | 11/1978 | Payen | 210/510.1 |

FOREIGN PATENT DOCUMENTS

| | | | |
|---|---|---|---|
| 52-35374 | 3/1977 | Japan | 210/402 |
| 59-29013 | 2/1984 | Japan | 210/510.1 |
| 60-1238 | 1/1985 | Japan . | |
| 151002 | 8/1985 | Japan . | |
| 152550 | 8/1985 | Japan . | |
| 918550 | 2/1963 | United Kingdom | 210/396 |

Primary Examiner—Richard V. Fisher
Assistant Examiner—Linda S. Evans
Attorney, Agent, or Firm—Wenderoth, Lind & Ponack

[57] ABSTRACT

A solid-liquid separating apparatus for obtaining a liquid component, for example, from a used solid-liquid mixture for reuse of the same, which includes a filtering member having a hollow cylindrical shape made of a hard porous material such as porous ceramics, sintered metal, layered metal net, sintered resin, unwoven cloth, and the like. The hard porous material is provided with continuous air holes and a device is provided for reducing the pressure in the inner hollow space of the filtering member during the rotation thereof. A scraper is provided for scraping a solid component remaining on the filtering surface of the filtering member after the liquid component is sucked into the inner space of the filtering member. The separating apparatus further includes a cutter for effectively removing the solid component and a device which allows reuse of the mixture with solid particles evenly distributed therein. The use of the hard porous material as the filtering member makes it possible to realize a smooth outer surface thereof without deformation to attain an even scraping operation, which results in an excellent filtering ability and improved durability of the apparatus itself.

15 Claims, 8 Drawing Sheets

FIG. 14 ns that the invention relates to an apparatus for performing separation of a solid-liquid mixture fluid (original fluid) of high density including fine solid particles, and more particularly to a solid-liquid separator including a device for effectively scraping a solid component, i.e. cake, layered on a filtering surface of a filtering member to thereby separate such liquid component.

APPARATUS FOR PERFORMING SEPARATION OF A SOLID-LIQUID MIXTURE

BACKGROUND OF THE INVENTION

1. Field of the Invention

This invention relates to an apparatus for performing separation of a solid-liquid mixture fluid (original fluid) of high density including fine solid particles, and more particularly to a solid-liquid separator including a device for effectively scraping a solid component, i.e. cake, layered on a filtering surface of a filtering member to thereby separate such liquid component.

2. Description of the Prior Art

Waste cutting oil or waste grinding liquid discharged from a cutting machine or grinding machine often contains a solid mixture consisting of many fine solid particles having a high density. For this reason, a conventional filtering device is not practical for use in filtering such waste oil or waste liquid but there are many kinds of solid-liquid separators or separating apparatus which are utilized for this purpose. The solid-liquid separators tend to be bulky and complicated, consequently each cutting machine or grinding machine is not equipped with such a solid-liquid separator or separating apparatus, which is instead used alternatingly in one factory.

Usually, as a separator which is used with one machine, there includes a centrifugal separator, a separator operable by use of a magnetic force and a separator assembly which includes a filtering device. The separators of these types have, however, no sufficient filtering ability or treating ability with respect to the original fluid containing solid particles with a content of more than 1000 ppm. Particularly, the separators of these types are not sufficiently utilized for the separation of expensive cutting oil or grinding liquid to recover and reuse the same after it is once used, and the recovered liquid or fluid further contains fine solid particles with the content order of more than 100 ppm. Accordingly, a further precise filtering operation is required to reuse the waste oil or liquid.

In order to achieve the object described above, a rotary-type filtering machine, such as an Oliver filtering machine, is proposed in which the supply of the filtering material, the removal of the filtering liquid, the generation of filtered material, the cleaning thereof, the dehydration operation, and the disposal thereof are continuously performed while rotating the filtering surface of the filtering machine. The filtering surface is usually of a cylindrical shape and the filtering operation is performed under a vacuum condition. The rotary-type filtering machine, after setting of the operational conditions, can continuously perform the filtering cleaning, dehydration, and discharging processes, and is therefore widely used recently for the dehydration operation in the chemical industry for the lapping original liquid, a rutile in the cyanide process, the filtering operation of pulp, cement, mud or slip, starch, an asbestos and paper pulp. The filtering body of the rotary-type filtering machine is constructed by a drum comprising a wooden or metal cylindrical shell and a filtering cloth, in which arcuate chambers are defined on the outer peripheral surface of the drum and the lattice surface of each arcuate chamber is covered with a filtering cloth or fine wire gauze. Wire may be helically wound around the filtering cloth or the gauze as the occasion demands. The respective arcuate chambers can perform the independent filtering operation with each other and several suction pipes extend from the respective chambers towards the axis of the cylindrical drum. A filtering cloth or a sintered material is used as a filtering member of the filtering body, so that the filtering operation cannot be performed very precisely, and moreover the structure thereof is made complicated. The maintenance, for instance, the exchange of the filtering cloth, is not easily carried out. In addition, since the filtering member is not integrally constructed and the preparations of the lattice and the wire gauze are required, it is considerably difficult to make the filtering surface smooth and it is also difficult to evenly scrape off the solid component adhering or layered on the filtering surface. The use of the filtering cloth supporting drum and lattice prevent the realization of a wide filtering area, and it is further difficult to make the filtering machine or device itself compact.

In summary, the use of a soft belt shaped porous material as a filtering member for a separating apparatus may be often subjected to deformation of the filtering surface of the filtering member during the sucking operation and therefore a central core or like members is required for eliminating this defect, resulting in a structure which is complicated and not economical. In view of this and other points, it is necessary to select and develop materials to be used as a filtering material. It may be required in the conventional solid-liquid separator to completely remove the solid component by the use of a scraping member or other additional means. It may also be required to effectively reuse the original fluid which has been supplied one time on the filtering surface but not subjected to the filtering operation.

Furthermore, in the foregoing discussion, although there is disclosed examples in which unnecessary solid materials or components are removed from the solid-liquid mixture fluid, the description will of course be applicable to examples in which necessary solid materials and components are separated to obtain them.

SUMMARY OF THE INVENTION

The primary object of this invention is to eliminate defects or avoid disadvantages encountered with the prior art technique of the solid-liquid separating operation and to provide a solid-liquid separating apparatus of a compact type having an excellent separating ability.

Another object of this invention is to provide a solid-liquid separating apparatus comprising means for completely removing the solid component of the solid-liquid mixture fluid layered on the filtering surface of a filtering member to thereby easily and completely regenerate the filtering surface without clogging the same with the solid particles and to make it possible to maintain a long period of operation and improve the average useful life thereof.

A further object of this invention is to provide a solid-liquid separating apparatus having an equipment or member to effectively suck the liquid component of the original mixture fluid without generating pulsation.

A still further object of this invention is to provide a filtering member for a solid-liquid separator comprising a selected hard porous material to improve the filtering ability and maintain the stable filtering operation for a long time.

A still further object of this invention is to provide an equipment arranged in the solid-liquid separating apparatus for stably maintaining the density of the original mixture fluid and the even distribution of the solid particles contained therein to prevent the sludge of the solid particles from being precipitated.

These and other objects, according to this invention, can be achieved by providing a solid-liquid separating apparatus for separating an original solid-liquid mixture fluid including many solid particles into solid and liquid components, which comprises a filtering member of a hollow cylindrical outer configuration made of a porous material provided with a plurality of continuous air holes, and plates disposed at both ends of the cylindrical filtering member to tightly close end openings thereof, a rotary shaft operatively connected to at least one of the end plates for supporting and rotating the filtering member, a device for reducing pressure in an inner space defined by the hollow cylindrical filtering member and the end plates during the rotation thereof, pipe means located above on one side of the filtering member for supplying the solid-liquid mixture fluid over an entire outer peripheral surface of the filtering member, the liquid component of the mixture fluid thereof being sucked into the inner space of the filtering member through the porous surface thereof by the operation of the pressure reducing device during the rotation of the filtering member, and a scraper located on the other side of the filtering member for scraping the solid component of the original mixture fluid remaining on the outer peripheral surface of the filtering member.

The separating apparatus of this invention can be further provided with a cutter for cutting the solid component layered on the filtering surface and not scraped by the scraper and the cutter is constructed to be movable along the entire longitudinal surface of the filtering member.

In the other embodiment of this invention, the separating apparatus is equipped with a reservoir for storing the mixture fluid, which has been supplied on the filtering surface but is not subjected to the filtering operation, for reuse of the mixture fluid.

The filtering member of this invention is made of a hard porous material in an integral manner such as a porous ceramic material, a porous sintered metal material, a layered metal net, a sintered resin, a hard porous resin, and a layered unwoven cloth and yarn which is heat treated.

It will of course be understood by persons skilled in the art that the present invention is not limited to the foregoing embodiments and includes other various modifications and alternatives, and the details thereof will be described hereinafter with an explanation made in conjunction with the accompanying drawings as well as the advantages or effects and functions of the solid-liquid separating apparatus of this invention.

The nature, principle and utility of the invention will become more apparent from the following detailed description when read in conjunction with the accompanying drawings.

DESCRIPTION OF THE PREFERRED EMBODIMENTS

Figure 1:
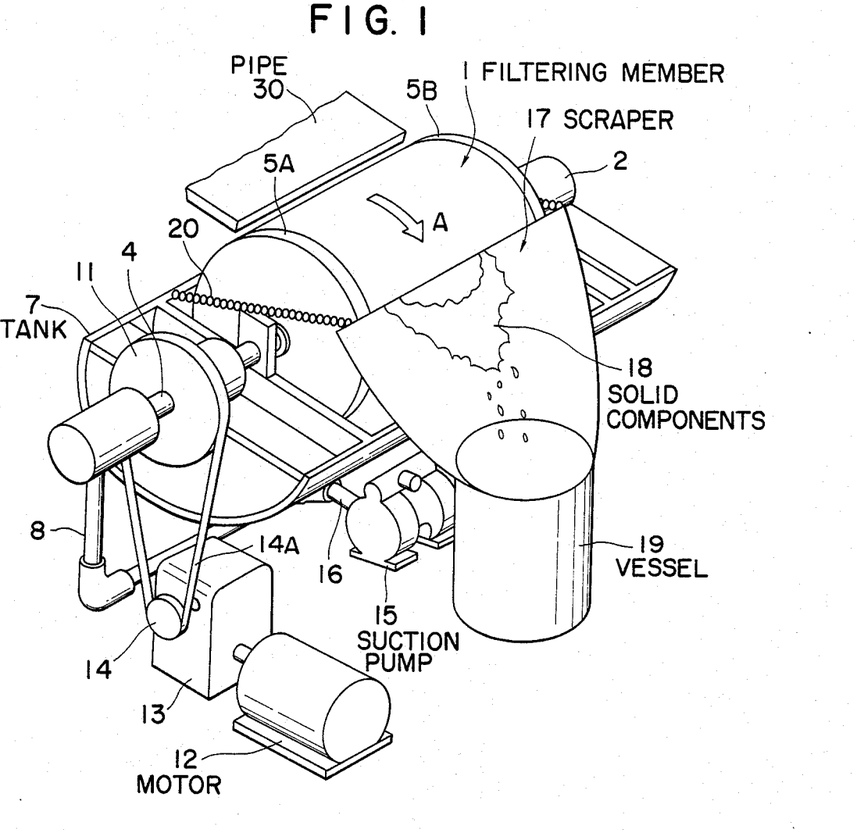
FIG. 1 is a perspective view of one embodiment of a solid-liquid separating apparatus according to this invention.

Referring to FIG. 1 showing a perspective view of one embodiment of a solid-liquid separating apparatus according to this invention, a drum-shaped or cylindrical filtering member 1 is provided, on the entire outer peripheral surface, with a number of fine holes formed as filtering holes having substantially the same diameters of about 0.1~500 $\mu$m, respectively, and in general, a filtering member 1 with holes having diameters of 5 $\mu$m, 10 $\mu$m, 25 $\mu$m or 50 $\mu$m is used. The filtering member 1 has an opening at each axial end portion thereof, each opening being tightly closed by a respective circular end plate 5A and 5B, one of which, i.e. 5A in FIG. 1, is provided with a central hole through which a hollow rotating shaft 4 is inserted. Since the filtering member 1 is provided with continuously formed air holes and is made of a hydrophilic material, the liquid component contained in the original fluid can be smoothly transmitted into the interior of the filtering member 1 in accordance with the capillary action. According to this capillary action, the filtering resistance is reduced and the liquid component in the original fluid is easily sucked into a cylindrical chamber within the cylindrical filtering member 1 without much reduction in the inner pressure thereof. The cylindrical filtering member 1 is supported for rotation at one end, i.e. end plate 5B in FIG. 1, by the body of a solid-liquid separation apparatus through the intermediary of a rotating support shaft 2. A pulley 11 is mounted on the hollow rotating shaft 4 and a belt 14A is wound around the pulley 11 and a wheel 14 disposed on a reduction mechanism 13 to which an electric motor 12 is connected through a driving shaft whereby the filtering member can be driven in rotation.

Figure 2:
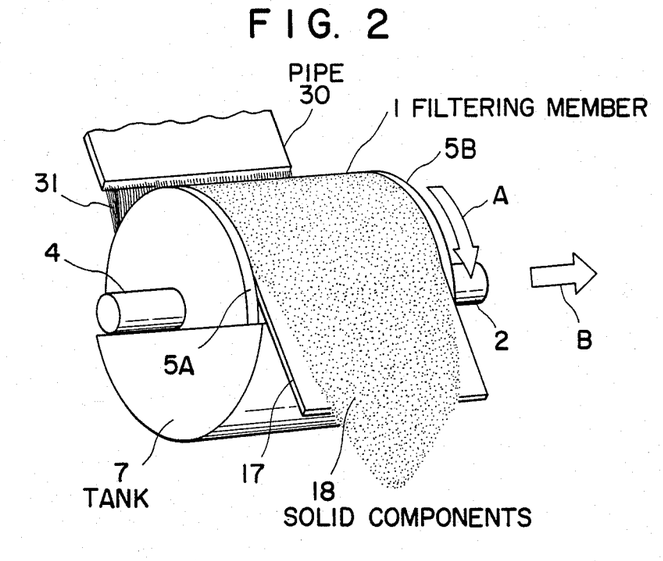
FIG. 2 is a perspective view of a separating portion including a filtering member of the separating apparatus shown in FIG. 1.
Figure 3:
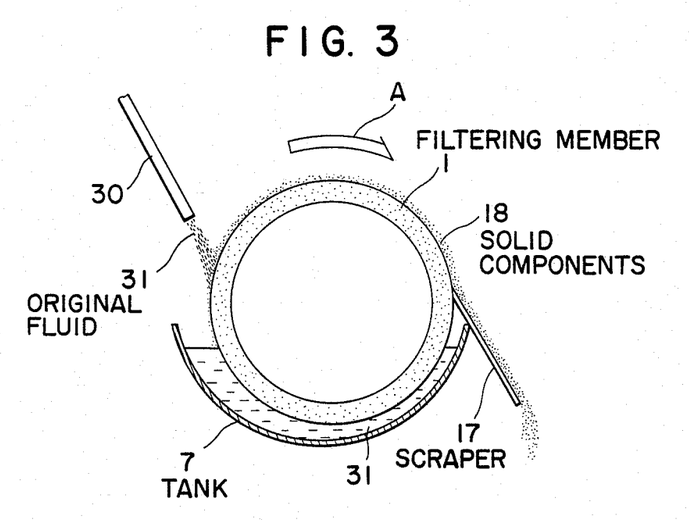
FIG. 3 is a cross sectional view of FIG. 2 taken along a line normal to the axis of the separating portion.

The cylindrical filtering member 1 is positioned so that the lower half thereof is immersed in a tank 7 for the original fluid, and as shown in FIGS. 2 and 3, the original fluid 31 is supplied and distributed on the outer peripheral surface of the filtering member 1 through an elongated opening of a pipe means 30, and the original fluid 31 which is not sucked through the filtering member 1 is received in the tank 7 located below the filtering member 1. A scraper 17 for scraping solid components 18 which becomes caked on the outer surface of the filtering member 1, is located at a position on the opposing side of the elongated pipe 30 so that the front edge of the scraper 17 is biased in contact with the outer surface of the filtering member 1 by means of a spring 20. The scraped solid components 18 are received in a vessel 19 located beneath the scraper 17.

Figure 4:
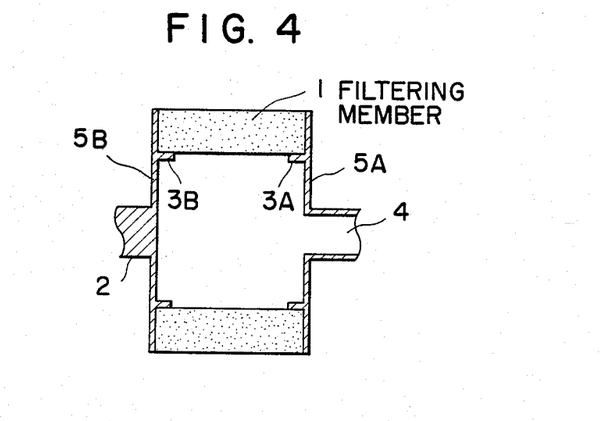
FIG. 4 is a longitudinal sectional view of the filtering member taken along the axis thereof.

The end portion of the hollow shaft 4 is operatively connected to a suction pump 15 through pipe means 16 which pumps the liquid component sucked into the cylindrical chamber of the filtering member 1 to a vessel (not shown). As shown in FIG. 4, flanged portions 3A and 3B are provided on the inside surfaces of the end plates 5A and 5B such that the inner surface of the filtering member 1 is in contact with the flanged portions 3A and 3B and the centering of the filtering member 1 is accomplished.

The filtering operation using the solid-liquid separating apparatus constructed as described above will be carried out in accordance with the manner described hereunder. When the original fluid 31 is supplied on the outer peripheral surface of the filtering member 1 through the elongated opening of the pipe 30 as shown in FIG. 3, the liquid component thereof is sucked into the cylindrical chamber of the filtering member 1 by the suction force of the suction pump 15 and the solid component is deposited in layers on the outer peripheral surface of the cylindrical filtering member 1. The liquid component sucked into the cylindrical filtering member 1 is discharged into an external vessel through the pipe means 16 and the solid components 18, on the other hand, remaining on the outer peripheral surface of the filtering member 1 are scraped by the scraper 17 located along the longitudinal direction of the filtering member 1 and deposited into the vessel 19, thereby completing the separation of the liquid and solid components.

In the application of the liquid-solid separating apparatus of the type described above, the original fluid supplied from the elongated pipe 30, which is connected to a liquid supply pipe of a cutting machine or a grinding machine, is distributed over the upper surface of the filtering member 1. The interior of the filtering member 1 is maintained in a pressure-reduced condition by the suction pump 15, which can comprise a liquid supply pump having a high self-sucking ability, a vacuum pump or an ejector, through the pipe means 16 and the hollow rotating shaft 4. The filtering member 1 is also rotated slowly in the direction of arrow A by the operation of the motor 12. Accordingly, the liquid component of the original fluid 31 distributed over the outer peripheral surface of the filtering member 1 is sucked into the cylindrical chamber of the filtering member 1 through the outer filtering surface thereof and is then discharged into an external piece of equipment through the hollow shaft 4 and the pipe means 16, and the solid components 18 remaining on the outer surface of the filtering member 1 form a stable cake-shaped layer. The solid components 18 of the cake-shaped layer are scraped by the scraper 17 and then removed, thus the surface portion of the filtering member 1 is ready for reuse at this time. The original fluid receiving tank 7 is adapted for receiving any excess fluid 31 and has a construction suitable for receiving the lower portion of the cylindrical filtering member 1, and under a condition in which the excess original fluid 31 fills the tank 7 so that the lower portion of the cylindrical filtering member 1 is dipped therein, the suction and separating operation of the filtering member 1, described hereinabove, is performed without further supply of the original fluid 31 from the elongated pipe 30. The recovering process of the original fluid 31 in the receiving tank 7 will be described hereinafter.

In the foregoing embodiment, although it is described that the cake-shaped layer of the solid components on the outer peripheral surface of the filtering member is scraped by the scraper 17, an alternative embodiment for further effectively scraping the solid components will be described hereunder in conjunction with FIG. 5.

In other words, in the use of the solid-liquid separating apparatus described hereinbefore, when the original fluid includes a lot of solid particles (more than several-thousand PPM), the average diameter of which is less than several $\mu$m, the solid components 18 evenly layered on the outer peripheral surface of the cylindrical filtering member 1 are not completely removed by the scraper 17, and moreover, in a case where the outer surface of the filtering material is deformed accidentally in the manufacturing process or by the nature of the original fluid used, it may at times become difficult to evenly scrape the solid components layered on that surface. This reduces the treating ability, and in the worst case, the separation process itself may have to be stopped to recover the treating ability. This also may result in stopping of the operation of the associated system as well as the separating apparatus. Accordingly, when it is required to carry out the work of scraping continuously or the separating operation for a long time, a more preferred embodiment of the solid-liquid separating device of a modified type will be described in conjunction with FIGS. 5 and 6, in which like reference numerals are added to elements or members similar to those shown in FIG. 1. The solid-liquid separating apparatus of FIG. 5 is provided with a cutter means 9 located above a scraper 17A for cutting and removing the cake of solid components layered on the outer peripheral surface of the cylindrical filtering member 1. As shown in FIG. 6, the cutter means 9 comprises a cutting blade 91 of a bite shape and a base 92 to which the cutting blade 91 is secured, and a screw rod 93 is threadedly engaged with a threaded hole extending through the base 92 in the longitudinal direction (X-X') of the filtering member 1. One end of the screw rod 93 is operatively connected to an electric motor 94 secured to a support frame 95A and the other end thereof is supported by a support frame 95B so that the cutting blade 91 can be moved forwardly and backwardly in the X-X' direction by the reversible driving rotation of the motor 94 and stops by the operation of limit switches 96A and 96B located in contact with the support frames 95A and 95B. The cutting blade 91 is also movable in a direction Y-Y' normal to the X-X' direction by an electric motor (not shown) in an engaged condition with the attachment base 92. The filtering operation of the separating apparatus shown in FIG. 5 is substantially the same as that described in connection with the embodiment shown in FIG. 1. Regarding the scraping operation, however, in a case where the outer surface of the filtering member is not completely even, the solid component cake 18 layered thereon cannot be completely removed by merely pressing the scraper 17A against the surface of the filtering member 1 and therefore, in order to recover the function of the filtering member it is necessary to completely remove the solid component cake 18, and for this purpose, the cutter means 9 is operated in accordance with the following manner.

Figure 5:
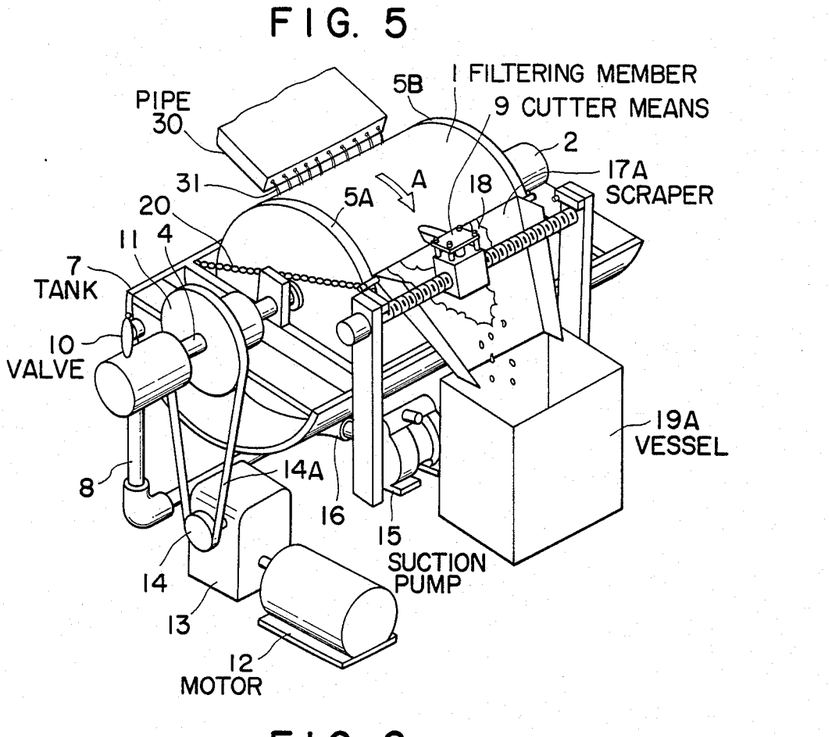
FIG. 5 is a perspective view of another embodiment of the solid-liquid separating apparatus according to this invention.
Figure 6:
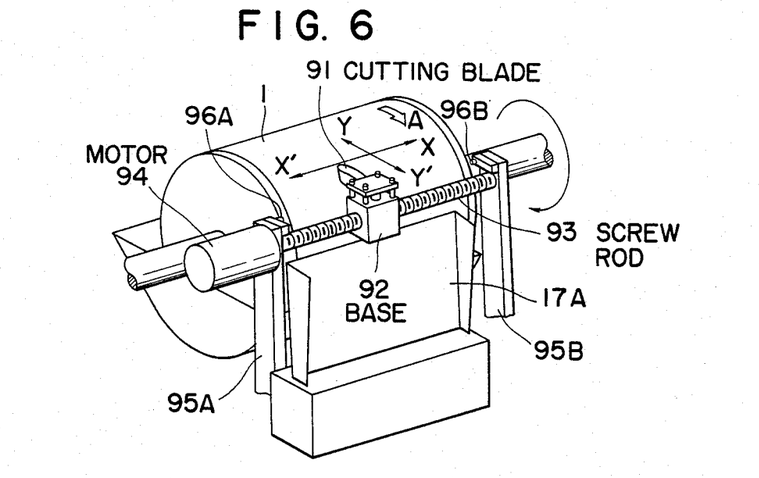
FIG. 6 is a perspective view of the separating portion shown in FIG. 5, showing in particular a cutting means for the filtering member shown in FIG. 5.

Referring to FIG. 5, a valve 10 is closed and the suction pump 15 is then operated to create the pressure reduced condition in the hollow inner chamber of the cylindrical filtering member 1 to suck the liquid component of the original fluid 31 which is supplied on the outer surface thereof through the elongated pipe 30. In this state, the cutting blade 91 is stationarily positioned at a location out of contact with the filtering surface of the filtering member 1. The layer of the solid component cake 18 which is not removed by the scraper 17A is grown gradually because the solid component cake 18 is subjected to the inward sucking force, and when the separating ability is reduced to a predetermined extent, the filtering operation is stopped and the cutter means 9 is operated to remove the layered cake 18 and recover the treating, i.e. filtering ability, of the separating apparatus. Namely, the supply of the original fluid 31 is first stopped and the sucking operation of the suction pump 15 is then stopped to facilitate the separation of the layered solid component cake 18. At the same time, the valve 10 is opened to release air into the inner chamber of the cylindrical filtering member 1 and thereby remove the pressure difference between the interior and the exterior of the cylinder chamber. In the next step, the limit switch 96B, for example, is operated to forwardly move the cutting blade 91 in the Y-Y' direction towards the outer surface of the filtering member 1 by a predetermined amount and the other limit switch 96A is also operated to move the cutter base in the X-X' direction by the operation of the motor 94. According to this operation, the solid component cake 18 layered on the outer surface of the filtering member is cut by the blade 91 and removed by the scraper 17A and the scraped cake is received in a vessel 19A located below the scraper 17A. During the cutting operation described above, the filtering member 1 is rotated in the direction A at a suitable speed of rotation, and by moving the cutting blade 91 in the X-X' direction at a speed corresponding to the speed of rotation of the filtering member 1 the removal of the layered solid component cake throughout the whole outer surface of the filtering member 1 can be performed, thus recovering the treating, i.e. filtering ability, thereof. In this cutting and removing operation, only the removal of the layered cake 18 can be performed by advancing the cutting blade 91 in the Y-direction so as to contact the filtering surface, but in a case where the filtering surface is clogged with particles caught by the filtering member 1 or a case where the surface is deformed due to the reason described hereinbefore, the clogging of the filtering surface and the deformation thereof can be effectively obviated by moving the cutting blade 91 in the Y-direction to cut into the layered cake 18 and thereby regenerate the smooth and even filtering surface.

When the filtering surface recovering operation has been completed, the cutting blade 91 is moved backwardly in the Y' direction so as to be away from the surface of the filtering member 1, the valve 10 is closed and simultaneously the suction pump 15 is operated to thereby create the pressure reduced condition in the cylinder chamber of the filtering member 1. Under these conditions, the original fluid 31 is supplied and the filtering operation is again started. As described above, since the filtering and cutting operations are alternately carried out automatically and periodically, even a highly dense original fluid including fine solid particles can be subjected to a stable and continuous separating operation.

Figure 7:
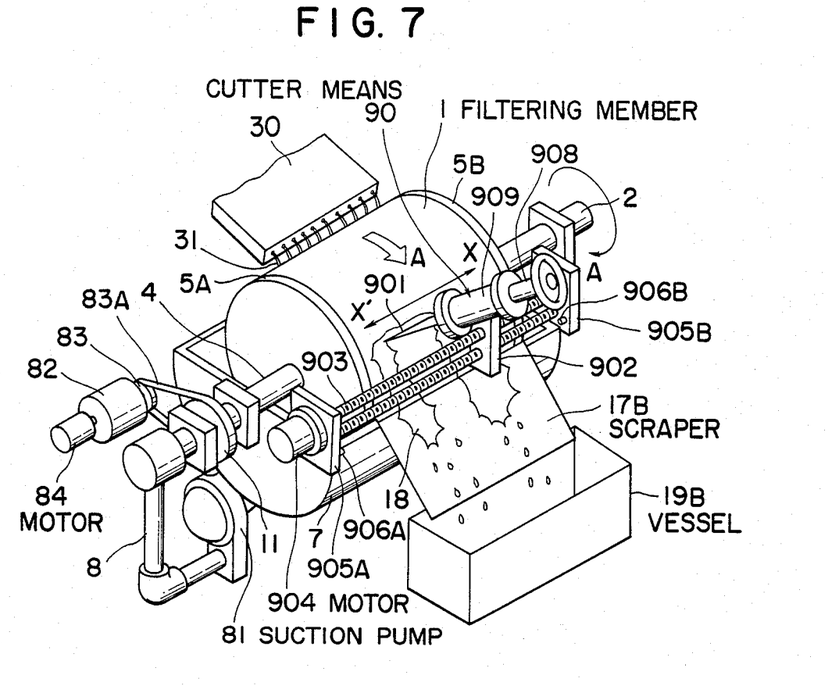
FIG. 7 is a perspective view showing a further embodiment of the solid-liquid separating apparatus according to this invention.

FIG. 7 shows a further embodiment of a solid-liquid separating apparatus according to this invention which is similar to that shown in FIG. 5 and in which like reference numerals are used to designate parts or equipment identical to those shown in FIG. 5.

With this embodiment, the cylindrical filtering member 1 is supported at one end, on the side of the end plate 5B, by a rotatable support shaft 2 and, on the other side, is supported by a hollow rotatable shaft 4, about which is mounted a pulley 11. A belt 83A is wound around the pulley 11 and a driving wheel 83 of a speed reduction mechanism 82, which is operatively connected to an electric motor 84. The cylindrical filtering member 1 is located so that substantially the lower half thereof is positioned into an original fluid receiving tank 7 disposed directly below the filtering member 1. An original fluid supplying pipe 30 of a rectangular shape provided with a plurality of nozzles is located at a position above the outer peripheral surface of the filtering member 1 and on one side thereof suitable for supplying the original fluid 31 on the filtering surface as shown in FIG. 7. The original fluid 31 poured on the filtering surface which is not sucked therethrough is received in the tank 7. A scraper 17B for scraping a solid component cake 18 layered on the filtering surface of the filtering member 1 is located on the other side thereof so that the front end of the scraper 17B is biased into contact with the filtering surface by suitable spring means (not shown), and a vessel 19B for receiving the scraped material is located below the scraper 17B. A suction pump 81 is connected to the end of the hollow shaft 4 through a pipe 8 to suck the filtered liquid component into the inner cylindrical chamber of the filtering member 1 and to pump the sucked liquid component to a vessel (not shown).

At a position above the scraper 17B, there is located a cutter means 90 for recovering the treating ability of the filtering member 1 by cutting and removing the solid components and the solid cake 18 layered on the outer filtering surface of the filtering member 1. The cutter means 90 has an outer configuration which does not totally cover the outer filtering surface but rather, is of a compact type suitable for evenly effecting the recovery treatment for the filtering ability of the filtering surface of the filtering member 1 by engaging minutely deformed areas of the filtering surface or following the eccentricity of the filtering material 1 itself. The cutter means 90 is provided with a cutting blade 901 having a sharp cutting edge so that the front end thereof vertically abuts against the filtering surface. The cutting blade 901 is supported by a holder 909 (described hereinafter), and an attachment base 902 supporting the blade holder 909 is provided with a threaded hole extending therethrough and in which a screw rod 903 is engaged in a direction parallel to a longitudinal direction X-X' of the drum-shaped filtering member 1. The one end of the screw rod 903 is operatively connected to a driving shaft of an electric motor 904 secured to a frame member 905A and the other end of the screw rod 903 is supported by a frame member 905B. The cutter means 90 is reciprocably moved along the filtering surface of the filtering member 1 in the X–X' direction by the operation of the reversible motor 904 and stops when the cutter means 90 contacts with limit switches 906A and 906B attached to the support frames 905A and 905B, respectively, whereby the cutter means 90 can be moved so as to totally cover the filtering surface.

Figure 8:
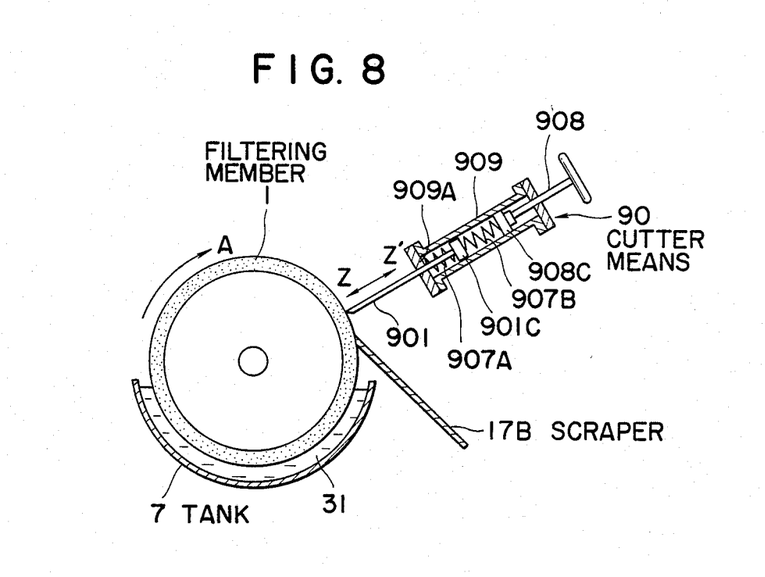
FIG. 8 is a cross sectional view of the apparatus shown in FIG. 7 to clearly show a cutting means for the filtering member.

FIG. 8 shows a cross sectional view of the separator shown in FIG. 7 taken along a line normal to the axis of the drum shaped filtering member 1. The blade holder 909 is of a hollow cylindrical shape in which are disposed a shaft 908 for adjusting a pressing force, a spring 907A between an end 901C of the cutting blade 901 and an end 909A of the blade holder 909, and a spring 997B between the an 908C of the pressure adjusting shaft 908 and the end 901C of the cutting blade 901. According to this arrangement, the cutting blade 901 is always biassed against the filtering surface of the filtering member 1 by means of the springs 907A and 907B, the biasing forces of which are adjusted by the pressure adjusting shaft 908 so that the cutting blade 901 is moved so as to always contact or separate from the filtering surface in a Z–Z' direction which is normal to the axis of the filtering member 1.

The filtering surface recovering process using the device shown in FIGS. 7 and 8 will be described hereunder.

The cutting blade 901 is held in a stationary position away from the filtering surface by adjusting the pressure adjusting shaft 908 during the usual solid-liquid separating operation. Under this condition, when the fine solid particles contained in the supplied original fluid 31 are caught in the filtering surface of the filtering member 1 and the filtering ability is thus reduced, the solid-liquid separating operation of the separating apparatus is temporarily interrupted in order to recover the filtering ability of the separating apparatus by operating the cutter means 90 in accordance with the following process.

The supply of the original fluid 31 is first stopped and then the operation of the suction pump 81 is also stopped for easy removal of the solid component layered on the surface of the filtering member 1. The cylindrical chamber of the filtering member 1 is opened to the atmosphere to thereby substantially eliminate the pressure difference between the inside and outside of the cylindrical chamber. The cutter means 90 is then operated to move the cutting blade 901 towards the filtering member 1 by a predetermined amount, in the Z direction, and the cutting blade 901 is stopped at a position in contact with the limit switch 906B, for example, by the operation of the pressure adjusting shaft 908 until the front end of the cutting blade 901 abuts against the surface of the filtering member 1. The cutter means 90 is then moved with the cutting blade 901 in a further pressure applied condition along the X–X' direction by the operation of the motor 904 until the cutting blade 901 reaches the other limit switch 906A. During this movement of the cutter means 90, the cutter blade 901 effectively cuts the cake 18 layered on the filtering surface and removes the cut solid cake, which is thereafter scraped by the scraper 17B having its front edge abutting under pressure against the filtering surface and is then received in the vessel 19B. The drum-shaped filtering member 1 is rotated continuously in the A direction during the cutting process, so that the solid component cake 18 layered on substantially the entire surface of the filtering member is removed by preliminarily setting the moving speed of the cutter means 90 in the X–X' direction in accordance with the speed of rotation of the cylindrical filtering member 1, thus recovering the filtering ability thereof.

In a modification, an automatically operated valve may be provided at the bottom of the tank 7 to return the original fluid 31 to the original source, and this modification will be described hereinafter. The end plates 5A and 5B are attached to the flanged portions 3A and 3B by means of a pressure fit, screw engagement or a bonding agent, for instance, and it may be preferred to locate packings between the flanged portions 3A and 3B and the filtering member 1 to prevent leakage from the cylindrical chamber of the filtering member 1.

The filtering member 1 is made of a porous material with interconnected air holes in meshes, such as a mixture of a phenolic resin and a polyvinyl acetal resin and the weight ratio of polyvinyl acetal resin with respect to the phenolic resin is within the range of $1/40 \sim \frac{1}{2}$. In a preferred embodiment, an average diameter of the air holes is about $0.1 \sim 500$ $\mu$m and the area occupied by the air holes is about $50 \sim 90\%$ of the total surface of the filtering member 1 (called porosity hereinafter). A method for manufacturing the porous material made of the phenolic resin or the phenolic resin including the polyvinyl acetal resin, which is disclosed in Japanese Patent Laid-open No. 1238/1985 filed by the same applicant as that of the subject application, can provide a remarkable filtering material having excellent characteristics in its filtering ability, stability in design, anti-waterproofness, strength against chemical agents and mechanical strength made of the phenolic resin provided with the interconnected continuous air holes. Such a material can be used as a filtering material having high precision while maintaining the continuous air holes and the high porosity which cannot be attained with a filtering cloth or a sintered material which is used conventionally. Moreover, the filtering material made of the resin of the type described above is superior in its strength and rigidity as well as in its stability in design or change of dimension against liquid and thermal variation because of the heat-hardening resin. In addition, since any reinforcing member and supporting mechanism is not required for the filtering member, it can be utilized as an integrally formed material. The addition of the small amount of the polyvinyl acetal resin to the phenolic resin endows the filtering member with the hydrophylic characteristic which is endowed by the polyvinyl acetal resin itself, and as a result, the water sucking speed of the filtering member, particularly for a water-type slurry, is extremely improved, thus providing the filtering material with a high filtering speed.

If the contained ratio of the polyvinyl acetal resin with respect to the phenolic resin is below about 1/40, the addition of the polyvinyl acetal resin has no beneficial effects since the material itself becomes frail, and the hardness thereof increases, thus adversely lowering the workability thereof. On the other hand, when that ratio is over $\frac{1}{2}$, the waterproof characteristic will be remarkably reduced and the material becomes excessively swollen and softened to an extent of becoming useless as a filtering material.

The polyvinyl acetal resin and the phenolic resin are evenly mixed during manufacturing under the condition of the precursor or prepolymer. However, the mixture does not form an even high molecular material in the form of a copolymerization or condensation polymerization and the respective resins are mixed in the extremely micromatic conditions. It is very difficult to fabricate a filtering material provided with air holes, the average diameter of which is less than 0.1 μm, and the fabrication thereof is undesirable from an economical point of view. On the other hand, when the average diameter is over 500 μm, it is also difficult to obtain a filtering material having a smooth outer surface, and in this case the filtering material is not suitable for a filtering member of a rotary type filtering device provided with a scraper. In the case where the porosity is below about 50%, the continuous air holes are hardly formed and in addition, the filtering material is largely damaged during the filtering process, thus reducing the average usable life thereof. In the case where the porosity is over about 90%, the strength of the fabricated filtering material will be extremely reduced in leaning against the pressure difference during the filtering process under a substantially vacuum condition.

It is required for the filtering member of a rotary type filtering device to have stability in dimensional change and resistance to oxidation damage under the wetted condition because the filtering member is always exposed to water or oil. Since the pressure difference between the inside and the outside of the filtering chamber may become as large as 1 Atm, it is required for the integral rotary type filtering device or member to have a mechanical strength greater than a predetermined standard. With this point, it was described hereinbefore that an integrally formed filtering member made of polyvinyl acetal resin, phenolic resin or mixture thereof is properly used, but in order to obtain further improved dimensional stability, anit-oxidation degradation, mechanical strength or the like, it may be desirable to effect a heat treatment of porous material of a mixed resin type under a non-oxidizing atmosphere, and a filtering material of this type will be produced in accordance with the following manner, which is described briefly.

A reaction original liquid is first prepared in accordance with a method comprising the steps of preparing a solution obtained by mixing a predetermined amount of prepolymer of liquid state phenolic resin with a predetermined amount of aqueous polyvinyl, adding to this solution, liquid of aqueous dispersion of a starch or denatured starch, an aldehyde and a phenolic resin as a cross linker for the polyvinyl acetal, an acid as a hardening agent for the aldehyde, the phenolic resin and the polymer, by necessary amounts, respectively, and finally agitating them evenly to obtain a mixture as the reaction original liquid. When it is required to add another additive, a suitable amount of the additive may be added to the original liquid. The reaction original liquid is then poured into a mold frame, hardened for about 10-20 hours at about 40°~80° C., and thereafter washed and dried. Moreover, as occasion demands, a carrying operation may be performed for about 10~100 hours at about 170°~200° C. to obtain a desired material for a filtering member.

The thus obtained material is of a block or cylindrical shape, and the material is worked and formed suitably for forming a filtering member for a rotary-type cylindrical filtering device or disc-shaped filtering device.

The filtering member for the rotary type filtering device of the type obtained by the manner described hereinbefore can easily be made to have various shapes by a relatively simple method in comparison with a filtering member fabricated in combination with a filtering cloth and a reinforcing and holding material. The filtering area can be widened and a filtering system itself is made compact and with low cost. In addition, since the filtering member according to this invention is integrally molded, the replacement of the filtering member can be easily carried out by providing sealing at the flanged portions, thus improving the workability of the filtering member.

Preferred examples of the filtering member according to this embodiment of this invention will be described hereunder.

EXAMPLE 1

The cylindrical filtering members made by the present invention and by conventional means were applied to a solid-liquid separating apparatus, respectively, to thereby carry out filtering tests or experiments, the results of which are represented by the following tables 1 and 2. As an original fluid to be filtered, there was used a waste fluid (density: about 2000 ppm) discharged in a case where an aluminum disc was ground by a lapping machine using a wet-type grind stone consisting of particles of GC #3000 (which is a green silicon carbide #3000 made by Fujimi Kenmazai Kogyo Co., Ltd. of Japan). The filtering member used had an outer diameter of 300 mm φ and a cylindrical length of 350 mm.

TABLE 1

| No | Filtering member | Average air-hole diameter [μm] | Porosity [%] | Average flow rate [l/min] | Density of fluid to be filtered [ppm] | Evaluation | Remarks |
|---|---|---|---|---|---|---|---|
| 1 | Filtering Cloth + Cylindrical Drum (Teijin; Yunex) | 5 | 49 | 29 | 480 | X | Hard to scrape because of no smooth filtering surface |
| 2 | Filtering Cloth + Cylindrical Drum; Filtering Cloth: Bylen | 5 | 52 | 31 | 450 | X | Hard to scrape because of no smooth filtering surface |
| 3 | Polyethylene Sintered Material | 5 | 41 | 6 | 370 | X | easily clogging |
| 4 | Example-1 of this invention | 20 | 77 | 56 | 100 | Δ | Good water absorbing capacity |
| 5 | Example-2 of this invention | 2 | 63 | — | — | X | Not filtered |
| 6 | Example-3 | 10 | 73 | 37 | 10 | O | Good water |

TABLE 1-continued

| No | Filtering member | Average air-hole diameter [μm] | Porosity [%] | Average flow rate [l/min] | Density of fluid to be filtered [ppm] | Evaluation | Remarks |
|---|---|---|---|---|---|---|---|
| | of this invention | | | | | | absorbing capacity |

TABLE 2

| Material (Kg) | Type of Filtering | | |
|---|---|---|---|
| | Example-1 of this invention 1 | Example-2 of this invention 2 | Example-3 of this invention 3 |
| Polyvinyl Alcohol Kurare; PVA 117 | 5.0 | 5.0 | 5.0 |
| Water Soluble Rezol SUMITOMO durez; PR-961A | 24.0 | 24.0 | 24.0 |
| Potato Starch | 3.0 | 0 | 0 |
| Rice Starch | 0 | 0 | 3.0 |
| Formalin (37%) | 7.0 | 7.0 | 7.0 |
| Sulfuric Acid (50%) | 5.0 | 5.0 | 5.0 |
| Reacting Condition | 15 Hours under Water at 50° C. | | |
| Total Liquid Amount | 100 (l) | | |

A method for manufacturing a filtering member is described hereunder in detail, and in Table 2, the final amount of the liquid is represented as 100 l, but in actual use, this final liquid amount will be replaced with an amount which is determined in accordance with the desired size of the filtering member.

The polyvinyl acetal is first dispersed in about 30 l, of water and thereafter, is heated for one hour at 95±° C. to completely dissolve the polyvinyl acetal, then the starch is dispersed in 25 l of water and mixed with the polyvinyl alcohol aqueous solution. Phenolic resin (liquid type water soluble rezol, for example) and formalin are added into the mixture of the solution of polyvinyl alcohol and starch and then evenly mixed, and thereafter, the temperature of the solution thus prepared is regulated so as to be in the range 50±5° C. Sulfuric acid is finally added and a predetermined amount of the finally obtained solution is evenly mixed and poured into a mold. The mold with the mixture of solution poured therein is subjected to a hardening reaction at about 50±2° C. for about 15 hours in a circulation type thermostatic oven or thermostatic chamber. After the reaction, the hardened material is removed from the mold and washed with a water shower to carry out the deoxidation process. The deoxidized material is then dried for about 48 hours to 75±3° C. in the circulation-type thermostatic chamber, and after the drying process, the material obtained is shaped so as to have a desired size as a final product.

EXAMPLE 2

Filtering tests were carried out using the following three types of filtering systems, and in these tests, the original liquid to be filtered which was used in the test of Example 1 was also used.
(1) A centrifugal separator using the filtering cloth of Sample No. 1 type proposed in Table 1 (Example 1 for comparison);
(2) A vacuum-type separator using a filtering paper (Example 2 for comparison); and
(3) A solid-liquid separator of the Example 3 type of this invention in the Table 1 (Example 3 according to this invention).

The following Table 3 shows the results of the filtering tests and the total evaluation of the separators used in these tests, and in Table 3, the average flow rate (l/min) is redivided by the filtering area (m²).

TABLE 3

| Type of filtering system | Compared Items | | | |
|---|---|---|---|---|
| | Density of Filtering Liquid [ppm] | Average Flow rate [l/min] | Cost, Workability and the like | Total Evaluation |
| Compared Example-1 | 520 | 50 | Batch type, Impossible to continuously operate, Large equipment, Expensive | X |
| Compared Example-2 | 200 | 34 | Expensive running cost because of use of expensive filtering paper | X |
| Compared Example-3 | 10 | 112 | Compact and cheap equipment and filtering member, movable structure, Continuously operable. | ◎ |

The solid-liquid separating apparatus according to this invention can be made compact with high separating ability, so that the separator can achieve superior performance for treating an expensive grinding liquid with extremely fine particles such as a sump solution from a grinding machine for performing a precise grinding operation such as mirror surface finishing. In addition, the grinding liquid, once used, can be regenerated up to a purified degree capable of being reused through the return device, and in the case where some suitable regenerating device is used, the solid components will be recovered as grinding particles and regenerated so as to be reused. In other words, the use of the solid-liquid separating apparatus according to this invention makes it possible to separate a liquid component having a concentration of about 10 ppm from the original fluid having a density of about several thousand ppm and to obtain a grinding liquid or cutting liquid having substantially the same properties or performances as that of the liquid before it was used in their abilities as well as outer configurations. The solid-liquid separating apparatus can be used continuously for a relatively long time without frequent replacement, and moreover, the filtering member can be used for several months by effecting washing treatment and the like.

Furthermore, the solid-liquid separating apparatus according to this invention can be easily applied as a compact device to a grinding machine, cutting machine and the like, and an expensive grinding liquid or cutting liquid can be reused without the need for disposing of the liquid once it is used, thus being economical and extremely reducing the load to be applied to a waste liquid treating device connected on the downstream side of the machine referred to above. The separator of this invention can also flexibly adapt to variations in the density of the original fluid and the differences in diameter of the solid particles contained in the original fluid, thus being widely applicable to the changes of the objects or operational conditions of the grinding machine or a like machine without revealing any inconvenience. In addition, when it is required to exchange the filtering member, it can be easily exchanged in only about 10 minutes or so without disassembling the grinding machine or cutting machine, thus hardly disturbing the operation of the machine or production efficiency thereof.

As a rotary type filtering member, there is usually used a filtering member made of a filtering cloth in combination with a reinforcing and holding member, but a filtering member of this type is insufficient in the filtering precision, filtering ability, cost, and maintenance thereof.

These problems or defects can be substantially eliminated by providing a rotary type filtering device utilizing the filtering member made in accordance with this invention, in which a lot of clean filtered liquid can be obtained from a lot of the original fluid to be filtered with low cost in every technical field.

Furthermore, according to the solid-liquid separating apparatus of this invention, the solid component cake layered on the outer surface of the filtering member can be scraped and the cake which was not sufficiently scraped and remains on the outer filtering surface can also be removed by cutting out the cake, so that the filtering member is periodically regenerated. Since the surface of the filtering member can be evenly formed, the scraping operation can be easily carried out, and the solid-liquid separating apparatus can filter an original fluid having a low density of less than about 500 ppm continuously and stably for a long time. Regarding an original fluid containing fine solid particles, it can also be filtered continuously and stably for a long time. It has been found, for example, that the filtering ability of the filtering member regenerated in accordance with the manner of this invention can be maintained continuously about ten times longer than the filtering ability of a conventional filtering member subjected to no regeneration treatment.

In the foregoing embodiments of the filtering member of this invention, although a single layered filtering member such as the one represented in FIG. 4, according to this invention has been disclosed, the filtering member is not limited to such a single layered type but rather, a filtering member of a multi-layer type can also be included.

Figure 9:
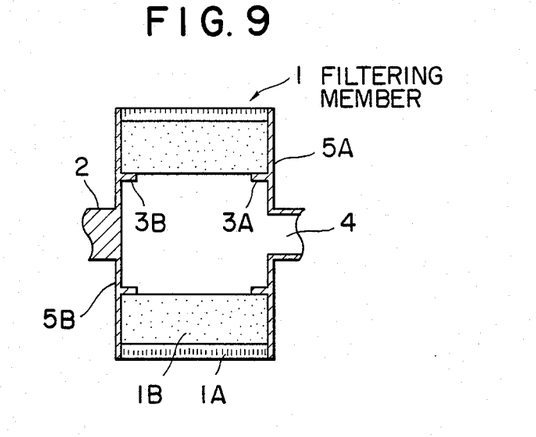
FIGS. 9 and 10 are respective longitudinal sectional views of examples of the filtering member of this invention taken along the axis thereof.
Figure 10:
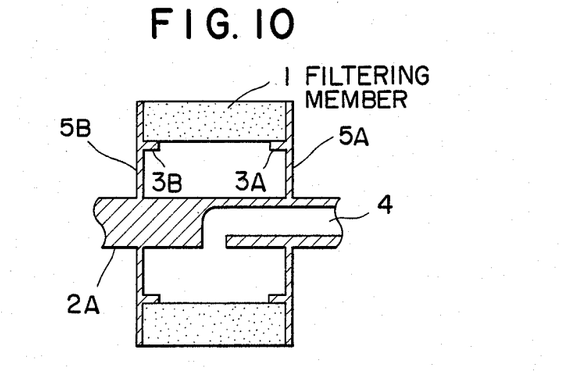

FIG. 9 is a cross-sectional view of a cylindrical or drum shaped filtering member 1 of a multi-layered type, which comprises an outer layer structure 1A having fine air-holes and an inner layer structure 1B provided with air holes each having a diameter larger than that of the air holes of the outer layer 1A. FIG. 10 shows a cross-section of the filtering member 1 in which a rotating shaft 2A extends through the cylindrical chamber of the filtering member 1 and the rotating shaft 2A also acts as a suction pipe 4 for sucking liquid.

Figure 11:
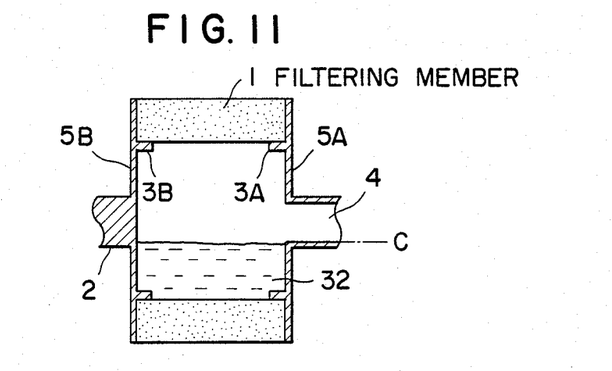
FIG. 11 is also a longitudinal sectional view similar to that of FIG. 9 or 10, in which the filtered liquid is stored in the inner cylinder chamber of the filtering member.

With the filtering operation of the filtering members of the types shown in FIGS. 9 and 10, however, the liquid component 32 sucked into the cylindrical chamber of the filtering member 1 is not discharged externally through the hollow pipe 4 until the upper level of the sucked liquid component 32 reaches a level higher than a level C, in FIG. 11 and accordingly the pressure reducing ability for sucking the liquid of the filtering member 1 is lowered. The repeating of the pressure reduction and the pressure reduction breakage will reveal a problem due to lack of increase in the amount of the discharge liquid. In the case where the pressure in the chamber of the cylindrical filtering member is continuously reduced, air will also be sucked into the chamber together with the liquid component 32 in accordance with the structure of the filtering member shown in FIG. 9 or 10, and this phenomenon will tend to generate pulsation of the suction pump 15 and then reveal a problem with respect to stabilizing the amount of flow of the discharge liquid.

Figure 12:
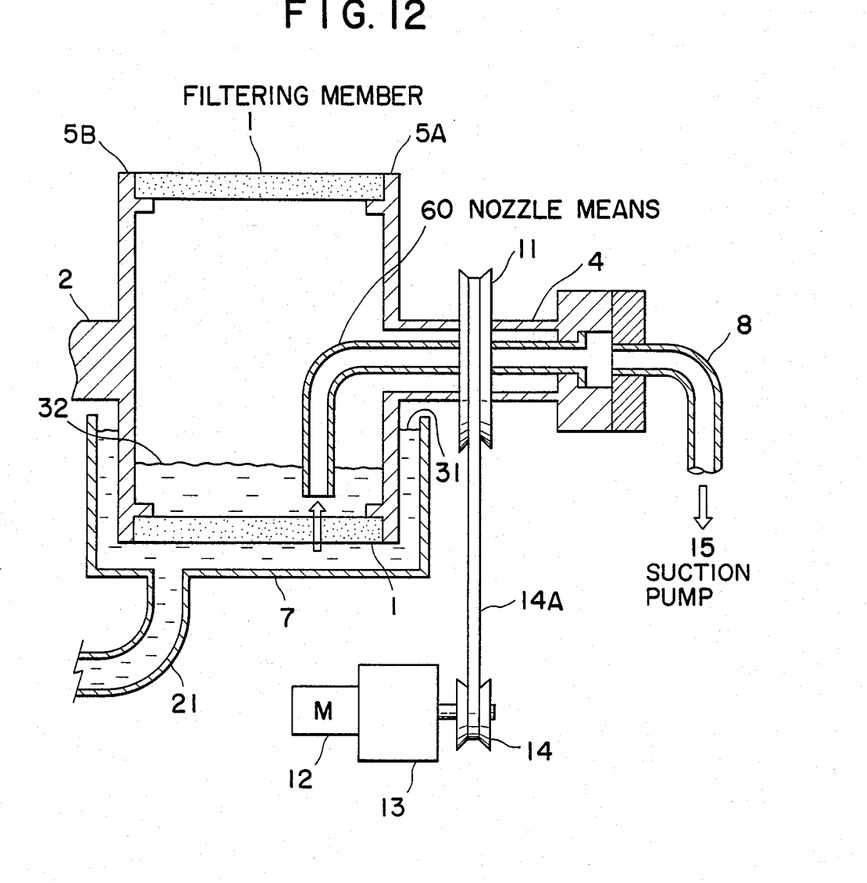
FIG. 12 is a longitudinal sectional view of the separating portion of the solid-liquid separating apparatus of this invention taken along the axis of the filtering member.

According to this invention, these problems will be solved by providing a filtering equipment shown as a cross-sectional view in FIG. 12 in which like reference numerals are added to portions or elements corresponding to those of the aforementioned embodiment such as shown in FIG. 1.

Referring to FIG. 12, the drum shaped filtering member 1 is provided with disc-shaped end plates 5A and 5B closing both axial openings thereof, and one of the end plate 5A, for example, has a central hole which is directly communicated with a hollow portion of the rotating shaft 4. A pulley 11 is mounted on the hollow shaft 4 and a belt means 14A is stretched around the pulley 11 and a driving wheel 14 of a speed reduction mechanism 13, which is operatively connected to an electrical motor 12. A nozzle means 60 extends through the inner hollow portion of the rotating shaft 4 reducing pressure in the cylindrical chamber of the filtering member 1 as well as sucking the liquid component therein. The outer end of the nozzle means 60 is hermetically coupled with one end of a pipe 8 and at that coupling portion the rotating shaft 4 is also sealed in a slidable structure. The other end of the pipe 8 is operatively connected to the suction pump 15 to suck the liquid component 32 through the nozzle means 60 to store the liquid in a vessel which is not shown. One free end portion of the nozzle means 60 is bent downwardly towards the original fluid tank 7 in the cylindrical chamber of the filtering member 1 along and close to the inner surface of the end plate 5A. The nozzle means 60 is located in the hollow rotating shaft 4 so that the free end of the nozzle means 60 is always directed downwardly as viewed in FIG. 12 regardless of the rotations of the filtering member 1 and the rotating shaft 4 to suck only the liquid component 32 out of the cylindrical chamber. A circulation pipe 21 is connected to the bottom of the original fluid receiving tank 7 for circulating the excessive original fluid received into the tank 7 back to the supply source of the original fluid by means of an automatic valve (not shown).

The filtering operation using the filtering equipment shown in FIG. 12 will be carried out in a manner described hereunder.

The original fluid 31 is supplied and distributed on the outer surface of the cylindrical filtering member 1 through the supply means 30 cormected to a discharge pipe of a grinding machine, for example, not shown. The inner cylindrical chamber of the filtering member 1 is maintained at a pressure reduced condition by means of the suction pump 15 through the pipes 8 and 4 and the nozzle means 60 and is rotated smoothly and slowly in the direction of Arrow A as shown in FIG. 1, by the operation of the electric motor 12, so that the liquid component 32 of the original fluid 31 spread over the outer cylindrical filtering surface is sucked into the cylindrical chamber of the filtering member 1 at the bottom thereof and the thus stored liquid component 32 is discharged through the nozzle means 60 and the pipes 4 and 8. With this embodiment, although the hollow shaft 4 through which the nozzle means 60 extends, is rotated it is of course possible to construct the shaft 2 connected to the other end plate 5B to be rotatable to thereby rotate the filtering member 1.

According to this embodiment of the solid-liquid separator, the nozzle means 60 is disposed near and along the inner surface of the filtering member 1 so that the front opening thereof is positioned at a location suitable for always sucking the liquid component 32 sucked into the cylindrical chamber of the filtering member 1 in a stable manner and with a stable flow rate without causing the pulsation movement. The location of the nozzle means 60 can not only achieve the stable sucking operation but also maintain the stable pressure reduced condition in the cylindrical chamber of the filtering member 1, thus improving the solid-liquid separation characteristics and reducing the operating time of the separator.

Figure 13:
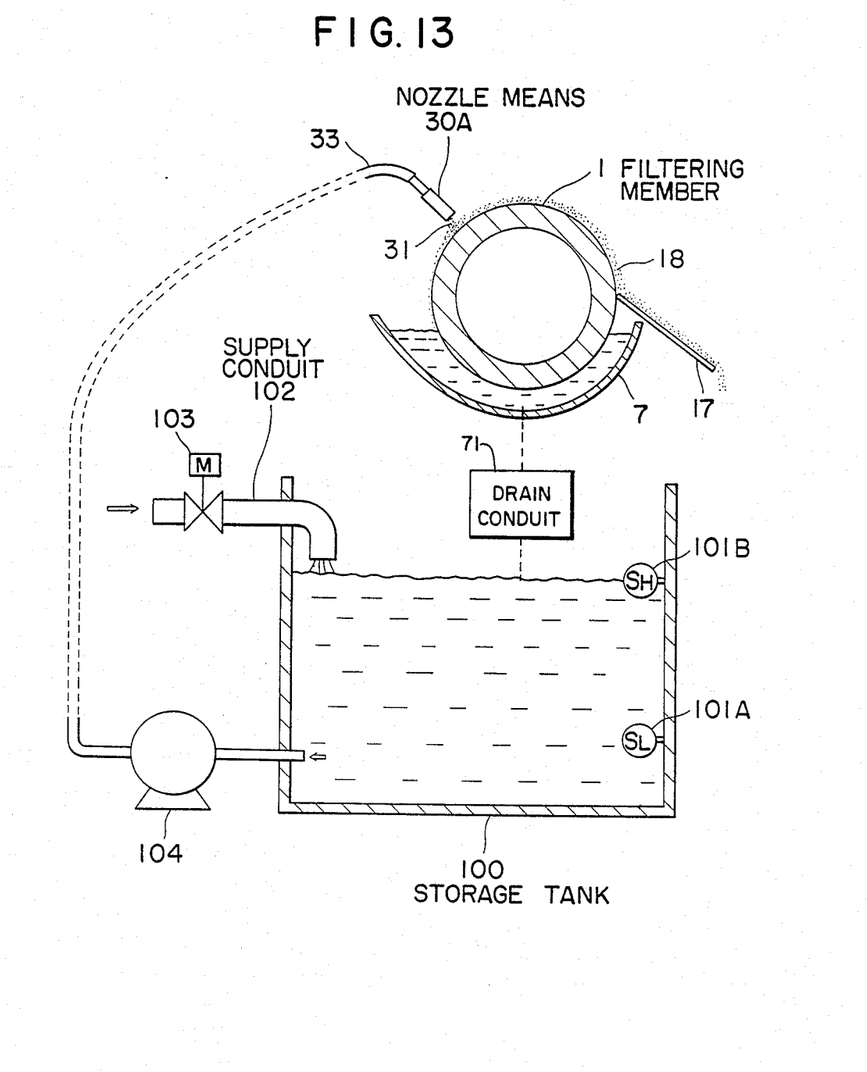
FIG. 13 is a schematic cross sectional view showing one example of an original fluid recovering equipment.

As shown in FIG. 13, the excessive original fluid 31 received in the tank 7 can be recovered through a drain conduit 71 into a storage tank or reservoir 100, in which the fluid 31 is mixed with a grinding or cutting liquid supplied from a grinding or cutting machine through a supply conduit 102, and the mixed fluid 31 is then spread over the outer surface of the filtering member 1 through a supply pipe 33 and a nozzle means 30A by means of a pump 104 connected between the supply pipe 33 and the tank 100.

Level switches 101A and 101B are attached to the side wall of the storage tank 100 for detecting the lower and upper limit levels of the original fluid 31 in the storage tank 100 in such a manner that when the fluid level is extremely lowered, the lower level switch 101A detects this fact and operates to stop the driving of the pump 104 thereby to stop the supply of the fluid onto the filtering surface of the solid-liquid separating apparatus, and on the other hand, when the level of the fluid 31 in the storage tank 100 is extremely increased, the upper level switch 101B detects this fact and operates to close an electromagnetic valve 103 operatively coupled to the supply conduit 102 to thereby stop the supply of the original fluid 31 into the storage tank 100 until the excessively stored fluid is fed into the solid-liquid separating apparatus through the supply pipe.

In use of the solid-liquid separating apparatus in association with the structures of the type described above and shown in FIG. 13, when the separating apparatus carries out the separation of the solid-liquid mixture fluid containing fine solid particles each having a diameter of about 0.01~10 μm, the solid particles each having a diameter of more than about 1.0 μm are precipitated as a sludge to the bottom of the storage tank 100 and the solid particles each having a diameter of less than about 1.0 μm are contained in the original fluid 31, which is then supplied back to the solid-liquid separating apparatus. These fine solid particles are not spread over the outer filtering surface because of their small diameters and are instead caught by the filtering member 1, which will result in clogging thereof, thus reducing the filtering ability of the filtering member 1. When the filtering ability is considerably reduced, the solid-liquid separating operation and associated operations will have to be interrupted to remove the solid particles or components layered on the filtering surface or caught in the air holes thereof of the filtering member and to recover the filtering ability, and otherwise, the filtering member will have to be exchanged with a new one.

In addition, there may occur a case where the sludge precipitated on the bottom of the storage tank 100 reaches the level of the level switch 101A, which will thereafter be burned in the sludge, and at that time, the operation of the level switch 101A is interrupted, which will bring about the idle running of the pump 104 and degrade the durability thereof.

The sludge can be prevented from precipitating in the storage tank 100 by effectively agitating or stirring the contents in the storage tank 100 by feeding air or gas under pressure therein or by using a screw means. The agitation thereof, however, may generate a lot of air bubbles, and particularly when the original fluid includes a surface acting agent, the bubbles of the surface acting agent will be greatly dispersed in the environmental atmosphere of the storage tank 100. The prevention of such an adverse phenomenon will require an arrangement of an enlarged reservoir in consideration of the generation of air bubbles or surface acting agent bubbles. These defects have an adverse effect on the pump 104 by degrading the durability thereof and by reducing the filtering ability of the solid-liquid separating apparatus, thus totally lowering the workability of the solid-liquid separating operation.

Figure 14:
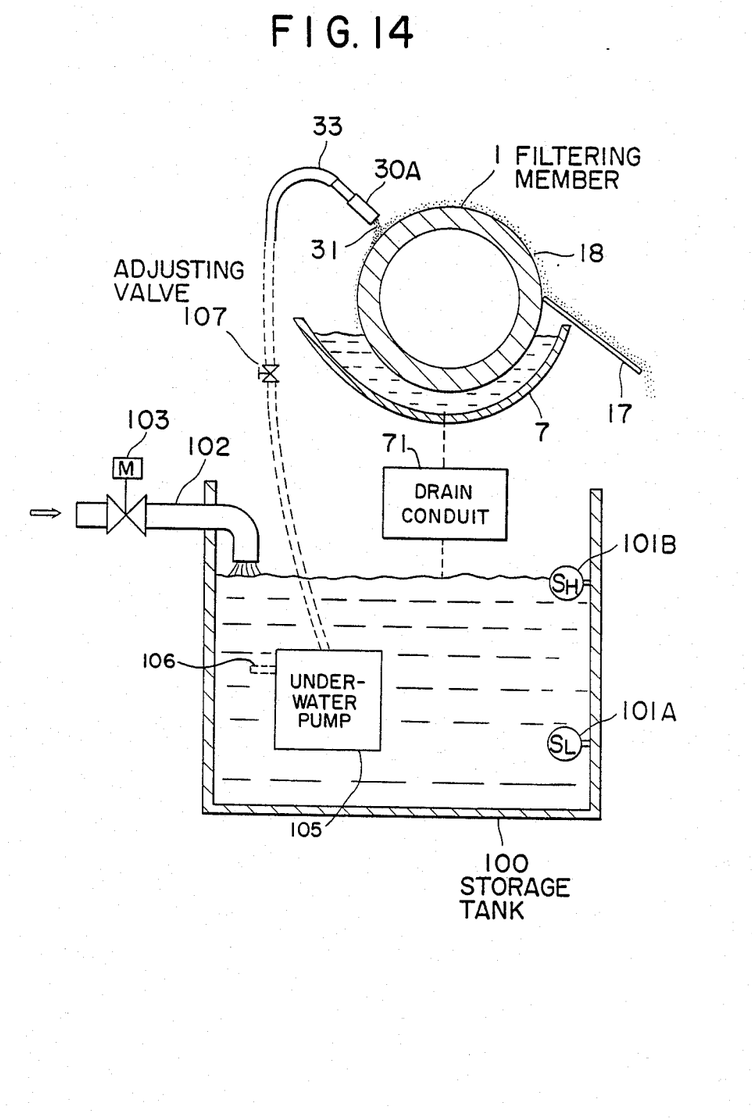
FIG. 14 is a cross sectional view of a sludge precipitation preventing device according to this invention used in combination with the original fluid recovering equipment.

In order to obviate or eliminate these defects or disadvantages, according to this invention, the location of a sludge precipitation preventing device will be proposed in conjunction with FIG. 14, the device being of the type immersed in the liquid in the storage tank 100 of the type shown in FIG. 13.

The excessive original fluid 31 received in the tank 7 is recovered into the storage tank 100 through the drain conduit 71 and the fluid 31 is mixed in the storage tank 100 with the grinding liquid or cutting liquid supplied from a grinding machine or cutting machine through the pipe 102. An underwater pump 105 is located on the bottom of the storage tank 100 and the underwater pump 105 is provided with a suction port at the lower portion thereof for sucking the mixed liquid 31 mentioned above and with a drain port at the upper portion thereof. The drain port is connected with two branch conduits, a supply conduit 33 and a return conduit 106. The conduit 33 is for supplying the liquid 31 onto the outer peripheral surface of the filtering member through the rectangular pipe means 30A and the supply flow rate is adjusted by a flow rate adjusting valve 107 operatively connected to the conduit 33 along the length thereof, and the return conduit 106 is provided with one end opened in the mixed liquid 31 in the storage tank 100 to return a part of the drained liquid 31. The location of the underwater pump 105 provided with the return conduit 106 prevents the intrusion of air bubbles into the stored liquid even if the surface acting agent is contained and facilitates the stationary agitations in the storage tank 100. When the stored liquid 31 in the storage tank 100 is used up and the lower level switch 101A is operated, the operation of the underwater pump 105 is thereby stopped and the agitation and supply of the mixed liquid 31 ceases. On the other hand, when the liquid 31 is excessively stored in the storage tank 100 and the upper level switch 101B is operated, the electromagnetic valve 103 is closed to thereby stop the supply of the liquid 31 to the storage tank 100 through the supply pipe 102 and the stored liquid is agitated and supplied to the solid-liquid separating apparatus through the conduit 33.

As stated above, since the original fluid 31 is always agitated calmly and slowly in the storage tank 100, the solid particles, even if the solid particles have a diameter of about 0.01~10 μm, contained in the liquid are also agitated without being precipitated, so that the original liquid 31 to be supplied to the filtering member 1 of the solid-liquid separator can be evenly distributed with the constant density thereby to achieve the constant solid-liquid separation properly and smoothly.

The following Table 4 shows the results of filtering tests using the sludge precipitation preventing device according to this invention and without use thereof. In these tests, as an original liquid to be filtered, ther is used a grind disposal liquid (with a density of about 2500 ppm) generated during a time when an aluminum-made disc is ground by a lapping machine using a wet-type grind stone consisting of particles of GC#3000. The filtering member used is made of a porous phenolic material with air holes the average diameter of which is 10 μm, and has an outer diameter of 300 mmφ, an inner diameter of 240 mmφ and a cylindrical length of 300 mmφ. The speed of revolution of the filtering member is 15 rpm and the pressure of the inner chamber of the filtering member is maintained at 300 Torr by means of a suction pump.

TABLE 4

| Items | | Sluge Precipitation Preventing Device | |
|---|---|---|---|
| | | Equipped | Not Equipped |
| Density of Supplied original liquid | Initial Condition | 2500 ppm | 2500 ppm |
| | After 30 minutes | 2300 ppm | 600 ppm |
| | Precipitation | 200 ppm | 1900 ppm |
| Average diameter of Particles contained in Original liquid | Initial Condition | 1 μm | 1 μm |
| | After 30 minutes | 1 μm | 0.3 μm |
| Time until clogging of Filtering member is generated | | 100 Hours | 1 Hour |

As can be understood from Table 4, according to the sludge precipitation preventing device of the solid-liquid separator of this invention, since air bubbles and bubbles of a surface acting agent, if used, are not contained in the liquid to be supplied to the filtering member, it is possible to always constantly supply the original liquid having an even density and containing solid components or particles, which are evenly distributed. The sludge precipitation preventing device is of a compact size which is easily located in the storage tank, so that the working space is effectively utilized without contaminating the environment. According to the location of the sludge precipitation device, expensive grinding or cutting liquid which is disposed as waste liquid in a conventional separator connected to a grinding or cutting machine, for example, can be effectively treated in a short time and immediately reused thus avoiding disposal thereof. In addition, the prevention of clogging of the filtering member is extremely improved, and accordingly the durability thereof is also remarkably extended, thus being economical as well as reducing the cost for the operation. The load to be applied to a waste liquid disposing device can be effectively reduced. Moreover, the sludge precipitation preventing device can attain many remarkable functions and advantages as well as those referred to above in association with the solid-liquid separation of this invention in the operational points and the economical points.

It should be understood that many modifications and adaptations of the invention will become apparent to those skilled in the art and it is intended to encompass such obvious modifications and changes in the scope of the claims appended hereto.

What is claimed is:

1. An apparatus for performing separation of a solid-liquid mixture including a large number of solid particles, comprising:

a filtering member having a hollow cylindrical outer configuration made of a hard porous material provided with means defining a plurality of continuous air holes, said porous material comprising a resin mixture of phenolic resin and polyvinyl acetal resin with a weight ratio of said phenolic resin with respect to said polyvinyl acetal resin being within a range of about 1/40 to ½, and further said resin mixture being provided with said plurality of air holes having an average diameter of about 0.1 to 500 μm and a porosity of about 50 to 90%;

end plates, each of which is disposed at an opposite end of said filtering member to seal end openings therein;

a rotary shaft means operatively connected to at least one of said end plates for supporting and rotating said filtering member;

a pressure reducing means for reducing a pressure in an inner space defined within said end plates and said filtering member during the rotation thereof;

a solid-liquid mixture supplying means located over one side of said filtering member for supplying said solid-liquid mixture over an outer peripheral surface of said filtering member so that the liquid component of the mixture is sucked into the inner space of said filtering member through the porous surface thereof by said pressure reducing means during the rotation of said filtering member; and a scraping means located on another side of said filtering member for scraping a solid component of said mixture remaining on the outer peripheral surface of said filtering member.

2. A separating apparatus according to claim 1, further including a cutting means located adjacent to the outer peripheral surface of said filtering member for cutting a portion of the solid component on the surface of said filtering member which is not scraped by said scraping means.

3. A separating apparatus according to claim 2, wherein said cutting means comprises a cutting blade supported by a cutter base, a member supporting said cutter base, and a screw rod engaged with said cutter base for moving said cutting blade along the entire longitudinal length of the outer surface of said filtering member.

4. A separating apparatus according to claim 3, wherein said screw rod is supported by frame members at both ends thereof and limit switches are respectively located on said frame members so as to restrict the longitudinal movement of said cutter base.

5. A separating apparatus according to claim 3, wherein said cutting means includes a securing member to which said cutting blade is secured, spring means for urging said cutting blade securing member in a direction normal to the outer surface of said filtering member, and an adjusting member for adjusting the urging force of said spring means so that when said cutting blade is urged by a predetermined pressure and moved longitudinally along the outer surface of said filtering member, the solid component remaining on said outer surface is cut.

6. A separating apparatus according to claim 1, wherein said solid-liquid mixture supplying neans comprises rectangular pipe means provided with a plurality of nozzles arranged so as to be located above and along the entire longitudinal length of the outer surface of said filtering member.

7. A separating apparatus according to claim 1, wherein said rotary shaft is a hollow rotary shaft having one end in fluid communication with the inner space of said filtering member and the other end operatively connected to said pressure reducing means.

8. A separating apparatus according to claim 7, wherein at least one nozzle means for removing filtered liquid from said filtering member is located within the hollow retary shaft with one end of said nozzle means connected to said pressure reducing means and the other end thereof extending within the hollow chamber of said filtering member and positioned in close proximity to the inner wall of said filtering member.

9. A separating apparatus according to claim 1, further including a tank located directly below said filtering member for receiving excess solid-liquid mixture supplied on the outer surface of said filtering member, a substantially lower half of said cylindrical filtering member being disposed within said tank.

10. A separating apparatus according to claim 1, wherein said hard porous material is a three-dimensional structure and said respective air holes are randomly and continuously arranged.

11. A separating apparatus according to claim 1, wherein said filtering member is an integral member having a continuous surface layer.

12. An apparatus for performing separation of a solid-liquid mixture including a large number of solid particles, comprising:
 a filtering member having a hollow cylindrical outer configuration made of a hard porous material provided with means defining a plurality of continuous air holes, said porous material comprising a resin mixture of phenolic resin and polyvinyl acetal resin with a weight ratio of said phenolic resin with respect to said polyvinyl acetal resin being within a range of about 1/40 to ½, and further said resin mixture being provided with said plurality of air holes having an average diameter of about 0.1 to 500 μm and a porosity of about 50 to 90%;
 end plates, each of which is disposed at an opposite end of said filtering member to seal end openings therein;
 a rotary shaft means operatively connected to at least one of said end plates for supporting and rotating said filtering member;
 a pressure reducing means for reducing a pressure in an inner space defined within said end plates and said filtering member during rotation thereof;
 a solid-liquid mixture supplying means located over one side of said filtering member for supplying said solid-liquid mixture over an outer peripheral surface of said filtering member;
 a scraping means located on another side of said filtering member for scraping a solid component of said mixture remaining on the outer peripheral surface of said filtering member;
 a tank for receiving said solid-liquid mixture which flows off said outer surface of said filtering member; and
 a storage tank for storing said solid-liquid mixture which overflows from said tank, said storage tank being connected to said tank by a supply conduit.

13. A separating apparatus according to claim 12, further including upper and lower level switches secured to an inner side wall of said storage tank for detecting upper and lower limit surface levels of the mixture stored therein.

14. A separating apparatus according to claim 12, wherein said storage tank is provided with an inlet means through which additional mixture is supplied thereto, and an underwater pump is located in said storage tank, said underwater pump being provided with a suction port for taking in the solid-liquid mixture and discharge ports for discharging the taken-in mixture, one of said discharge ports being connected through a conduit to said solid-liquid mixture supplying means, thereby preventing sludge contained in said solid-liquid mixture from being precipitated in said storage tank.

15. A separating apparatus according to claim 14, wherein another one of said discharge ports of said underwater pump is located at a bottom of said storage tank.

* * * * *